Patented Feb. 18, 1930

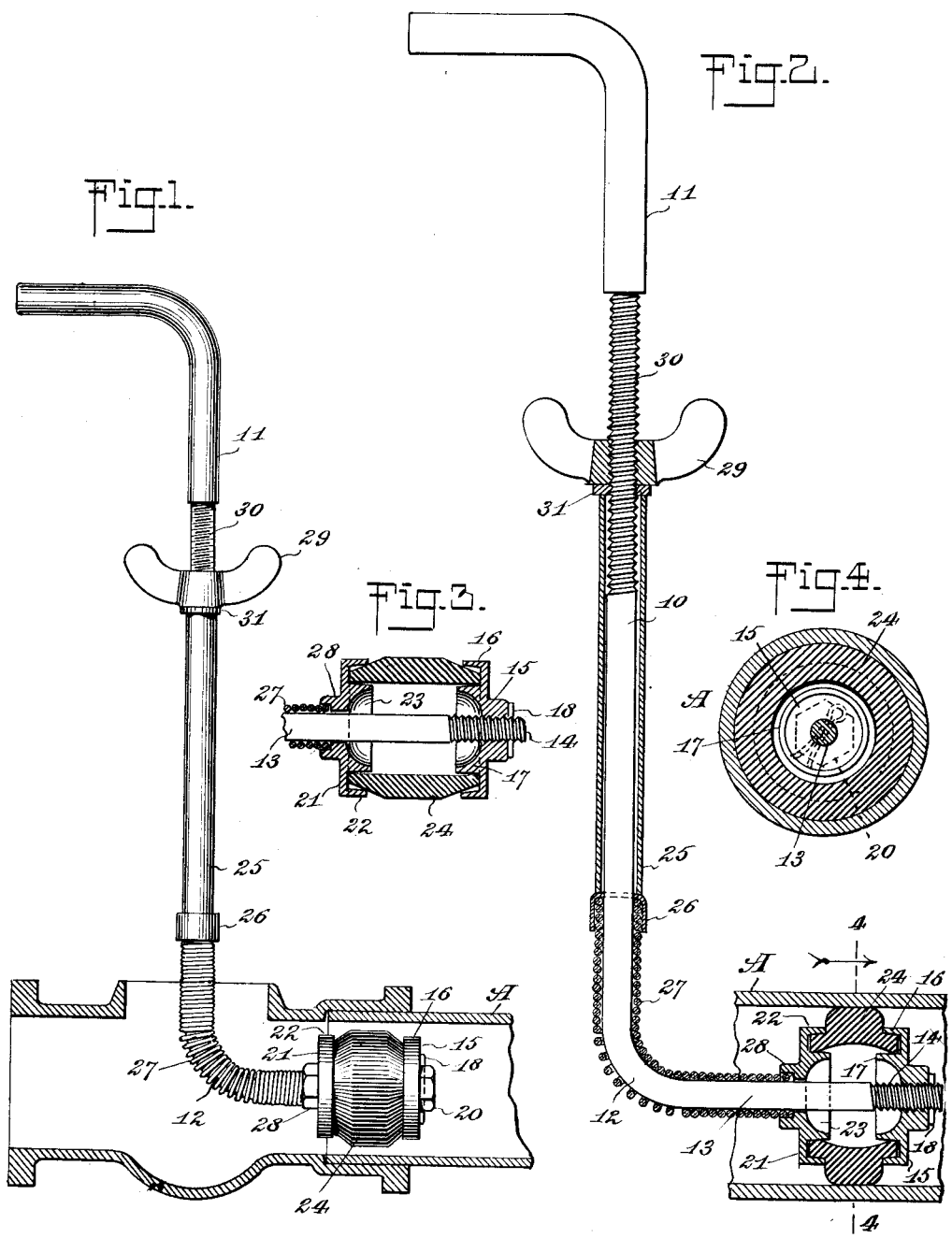

1,747,933

UNITED STATES PATENT OFFICE

PATRICK GOODMAN AND BENI LEONE, OF BROOKLYN, NEW YORK; SAID LEONE ASSIGNOR TO SAID GOODMAN

EXPANSION PLUG FOR PIPES

Application filed June 22, 1928. Serial No. 287,466.

Our invention relates to a plug for insertion in a pipe fitting and having an expansion head adapted to effect a closure of the pipe.

Heretofore devices for the indicated purpose and of the general type of our present invention, in that they were insertable through a fitting and expansible to close a pipe, had a recognized defect in that the elbow bend formed in the device did not afford sufficient clearance for the operative movement involved in expanding the resilient head.

The general object of our invention is to provide an expansion plug of the indicated character in which ample clearance is provided for the operation involved in expanding the head.

The nature of our invention and the distinguishing features in which the invention resides, as well as their advantages, will clearly appear as the description proceeds.

Reference is to be had to the accompanying drawings forming part of this specification, it being understood that the drawings are merely illustrative of one example of the invention.

Figure 1 is a side elevation of an expansion plug embodying our invention, illustrating the same in association with a pipe fitting shown in longitudinal section;

Figure 2 is a view similar to Figure 1, but with the parts, except the handled rod, in longitudinal section, the plug being illustrated in expanded form;

Figure 3 is a fragmentary longitudinal section showing the expansion head in the form before the expanding pressure has been applied thereto.

Figure 4 is a cross section on the line 4—4 of Figure 2.

In carrying out our invention in accordance with the illustrated example, a rod 10 is provided having a bent handle portion 11. Adjacent to the front end of the rod 10 the same is formed with an elbow bend 12 from which a portion 13 extends at about right angles to the general direction of the main length of the rod 10.

The forward terminal end of the rod 10 is formed with threads 14 on to which is threaded a front disc 15 having a rearwardly directed annular flange 16 at its periphery. Also projecting rearwardly at the inner side of the disc 15 is a boss 17 advantageously dished or concaved, as shown clearly in Figures 2 and 3. To prevent displacement of the disc 15 a cotter pin or equivalent retaining member may be employed extending transversely through the threaded end 14. A central boss 20 is formed at the front end of the disc 15 and made polygonal to take a wrench.

Slidably fitted on the straight front portion 13 of the rod 10 is a second disc 21 constituting a clamp means for the expansion head, said disc 21 having an inwardly directed peripheral flange 22 and a boss 23 at the front face and opposed to boss 17. A resilient expansion ring 24, usually of comparatively soft rubber, is disposed between the discs 15 and 21, the front edge being positioned between the flange 16 and the boss 17 of disc 15, and the rear edge being positioned between the flange 22 and boss 23 of disc 21.

For causing the disc 21 to move under pressure toward disc 15 for expanding the ring 24, we provide in accordance with our invention an elongated sleeve 25 on the rod 10. The front end of the sleeve 25 bears against the rear flanged end of a ferrule 26 of sufficient diameter to accommodate the rear end of a spiral spring 27 coiled about the rod 10 at the bend 12 and for a distance rearward of said bend and forward of the same to encircle the portion 13 of rod 10.

For exerting pressure on the rear end of sleeve 25 and making said pressure effective through the medium of spring 27 against the rear side of clamp disc 21, a nut 29 is provided, here shown as a wing nut turning on the threaded portion of rod 10, which threaded portion is adjacent to the handled end 11 of rod 10. The pressure of the nut 29 may be exerted against a washer 31 advantageously as shown in Figures 1 and 2.

With the described construction the unexpanded expansion head composed of the discs 15 and 21 and the ring 24 is passed through the fitting a of a pipe A to be plugged, as shown in Figure 2. With the plug in the position within the pipe A, nut 29 is turned forwardly on threaded portion 30 of rod 10, and the pressure thus exerted against the rear end of sleeve 25 will in turn cause pressure to be exerted by said sleeve 25 against ferrule 26, and thus against the rear end of spring 27. Spring 27 in turn exerts pressure against disc 21 thereby contracting the space between the discs 21 and 15. Thus the central portion of the ring 24 will be expanded to form contact with the surfaces of pipe A, and the edge portions of the ring 24 will retain approximately their form in the space between flanges 16 and 17 and the flange 21 and boss 23.

Our improved device it will be apparent affords unrestricted movement of the spring 27 on rod 10 and its elbow 12. The necessary expanding pressure may thus be quickly and conveniently applied against the ring 24.

We would state further that while the illustrated example constitutes a practical embodiment of our invention, we do not limit ourselves strictly to the exact details herein illustrated, since, manifestly, the same can be considerably varied without departure from the spirit of the invention as defined in the appended claims.

We claim:

1. An expansion plug, including a rod having an approximately right angular bend, an expansion head carried on the rod forward of said bend, a spring on said rod adapted to exert pressure on said head to expand the same, and means on the rod to cause pressure to be exerted against the rear end of the spring.

2. In an expansion plug for pipes, a rod adapted for insertion in pipes to be plugged, a disc on said rod at the forward end, a second disc spaced from the first mentioned disc and movable on the rod, a resilient ring between said discs, a spring bearing at one end against the movable disc, and means to exert pressure on the spring at the opposite end.

3. An expansion plug for pipes, including a rod having a right angular bend, an expansion head on said rod forward of said bend, a spring exerting pressure at the forward end against said head to expand the same, a sleeve on the rod rearward of the spring, and adapted to bear against the same, and a nut threaded on the rod rearward of the sleeve and adapted to cause said sleeve to exert pressure on the spring.

4. An expansion plug for pipes, including a rod having an approximately right angular bend, an expansion head on said rod at the front end, a spring coiled about the rod at the bend thereof, the front end of said spring adapted to exert pressure on said head to expand the same, a ferrule at the rear end of the spring bearing against the same, a sleeve having its front end bearing against said ferrule, and a nut threaded on the rod rearward of the sleeve and adapted to cause movement of the sleeve to exert pressure against the ferrule for exerting pressure on the spring for expanding the head.

PATRICK GOODMAN.
BENI LEONE.